United States Patent [19]

Chikuma

[11] Patent Number: 5,220,423
[45] Date of Patent: Jun. 15, 1993

[54] APPARATUS FOR CONTROLLING DISPLAY OF AN IMAGE ON A LARGE ASPECT RATIO TELEVISION SCREEN

[75] Inventor: Takashi Chikuma, Kanagawa, Japan

[73] Assignee: Sony Corporation, Tokyo, Japan

[21] Appl. No.: 666,596

[22] Filed: Mar. 8, 1991

[30] Foreign Application Priority Data

Mar. 13, 1990 [JP] Japan ................... 2-062203

[51] Int. Cl.⁵ .................. H04N 11/20; H04N 5/66; H04N 7/01; H04N 7/04
[52] U.S. Cl. ..................... 358/140; 358/11; 358/12; 358/141
[58] Field of Search ............ 358/140, 11, 12, 183, 358/230, 141, 188, 180, 245

[56] References Cited

U.S. PATENT DOCUMENTS

| | | | |
|---|---|---|---|
| 4,385,324 | 5/1983 | Shioda et al. | 358/237 |
| 4,394,690 | 7/1983 | Kobayashi | 358/180 |
| 4,797,746 | 1/1989 | Ashcraft | 358/140 |
| 4,864,405 | 9/1989 | Chambers | 358/146 |
| 4,953,025 | 8/1990 | Saitoh et al. | 358/230 |
| 4,984,078 | 1/1991 | Skinner et al. | 358/12 |
| 4,984,081 | 1/1991 | Miyochi et al. | 358/140 |
| 5,103,309 | 4/1992 | Hara | 358/12 |
| 5,161,002 | 11/1992 | Rodriguez-Cavazos et al. | 358/11 |

*Primary Examiner*—James J. Groody
*Assistant Examiner*—Glenton B. Burgess
*Attorney, Agent, or Firm*—Lewis H. Eslinger; Jay H. Maioli

[57] ABSTRACT

In a television receiver having a picture tube with the picture plane aspect ratio being different from the image size aspect ratio in the existing standard television system, when an image in the existing standard television system is displayed, variation in the video signal positioned adjacent to at least one of the vertical ends on the picture plane of the picture tube is detected. If no variation an enlargement mode enlarging the image size is selected, and if any variation a normal mode displaying the image in ordinary size is selected, thereby the enlargement mode or the normal mode is selected automatically in response to the effective image size and the troublesome work of manually changing the modes is eliminated.

8 Claims, 3 Drawing Sheets

APPARATUS FOR CONTROLLING DISPLAY OF AN IMAGE ON A LARGE ASPECT RATIO TELEVISION SCREEN

BACKGROUND OF THE INVENTION

1. Field of the Invention

The present invention relates to a television receiver wherein images in a plurality of television systems being different in image size aspect ratios can be displayed.

2. Description of the Prior Art

A television receiver in the prior art has a picture tube with the aspect ratio of 16:9 in order to display images in the high vision television system. The television receiver can display also images in the existing standard television system in general.

On the other hand, in the existing standard television system (such as NTSC system), the image size aspect ratio is 4:3, but since an image in a movie or the like is long sideways, in order that the system is converted and the whole picture plane can be displayed in the existing standard television system, software called letter box in which the upper and lower sides are cut may be used. In the letter box size, the effective image size aspect ratio is made about 16:9, and other portion is constituted as a single color such as black. A television receiver in the prior art may be changed in normal mode where the image size is displayed in normal size and in enlargement mode where the image size is enlarged in vertical and horizontal directions.

When the video signals of the letter box size in the existing standard television system are inputted, the image displayed in normal mode becomes as shown in FIG. 3(a), but the image displayed in enlargement mode becomes as shown in FIG. 3(b) and the effective image state can be obtained. Also when the video signals of normal size in the existing standard television system are inputted, the image displayed in enlargement mode becomes as shown in FIG. 4(b) where the image is lacking in upper and lower sides and a problem of conflict with the copyright may occur and the effective information can not be displayed. Consequently, the display in normal mode as shown in FIG. 4(a) is preferable.

In a television receiver in the prior art, since changing of enlargement mode and normal mode in the picture plane is performed by manual operation, the changing work is troublesome. Particularly, if a commercial message or the like is inserted at the midway of software in letter box size, the changing work is troublesome and the picture plane can not be seen well.

SUMMARY OF THE INVENTION

In view of the above-mentioned problems in the prior art, an object of the invention is to provide a television receiver wherein modes of the picture plane can be changed to the optimum automatically in response to the effective image size.

In order to solve the above-mentioned problems, a television receiver of the invention has a picture tube with the picture plane aspect ratio being different from the image size aspect ratio in the existing standard television system, and when the image in the existing standard television system is displayed onto the picture plane the decision is performed as to whether the video signal positioned adjacent to at least one of the ends in the vertical direction on the picture plane of the picture tube is varied or not. If the signal is not varied, enlargement mode is selected where the image size is enlarged in vertical and horizontal directions to be fitted to the picture plane size of the picture tube, and if it is varied, normal mode is selected where the image size is not enlarged or decreased but the image is displayed as it is.

For example, if the video signals of letter box size in the existing standard television system are inputted, since the video signal positioned near both ends of the picture plane of the picture tube is not varied, enlargement mode is selected and the effective image is displayed on the whole picture plane. If the video signals of normal size in the existing standard television system are inputted, since the video signal is varied, normal mode is selected and the effective image without lacking in upper and lower sides is displayed on the picture plane.

DESCRIPTION OF THE PREFERRED EMBODIMENTS

An embodiment of the invention will be described referring to the accompanying drawings as follows.

Figure 1:
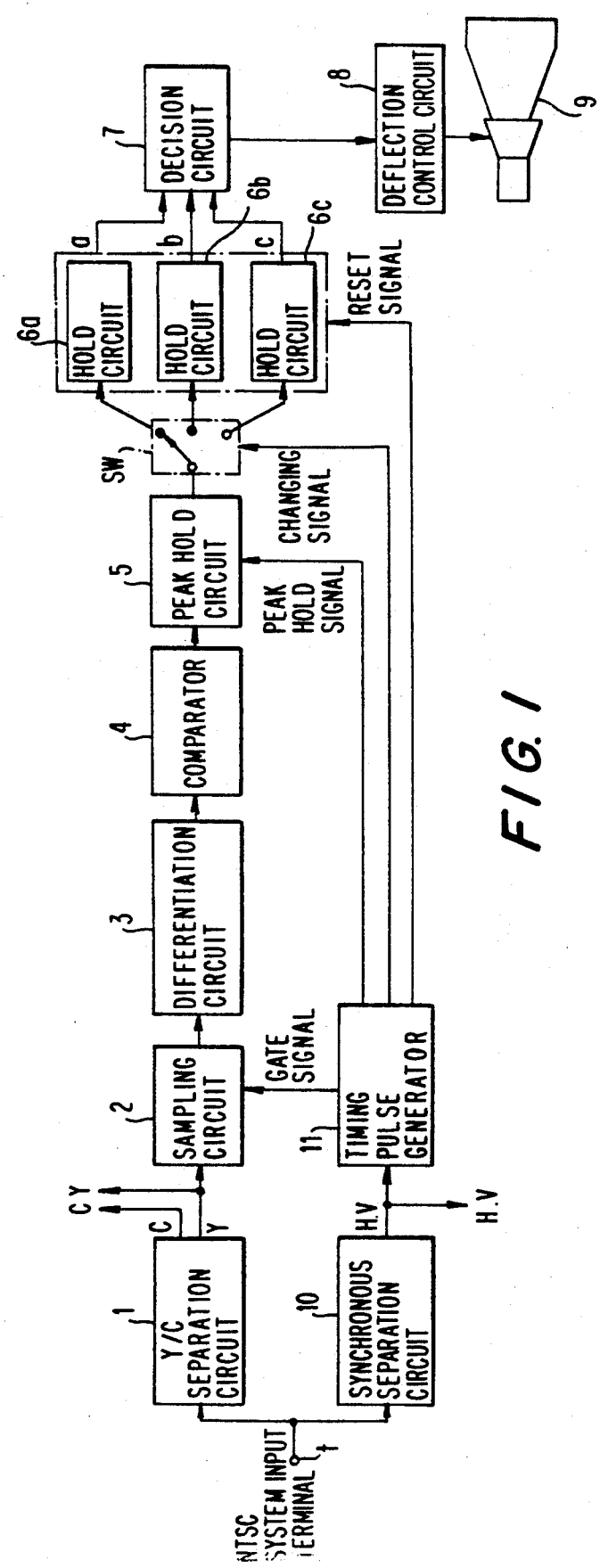
FIG. 1 is a circuit block diagram of a television receiver as an embodiment of the invention.
Figure 2:
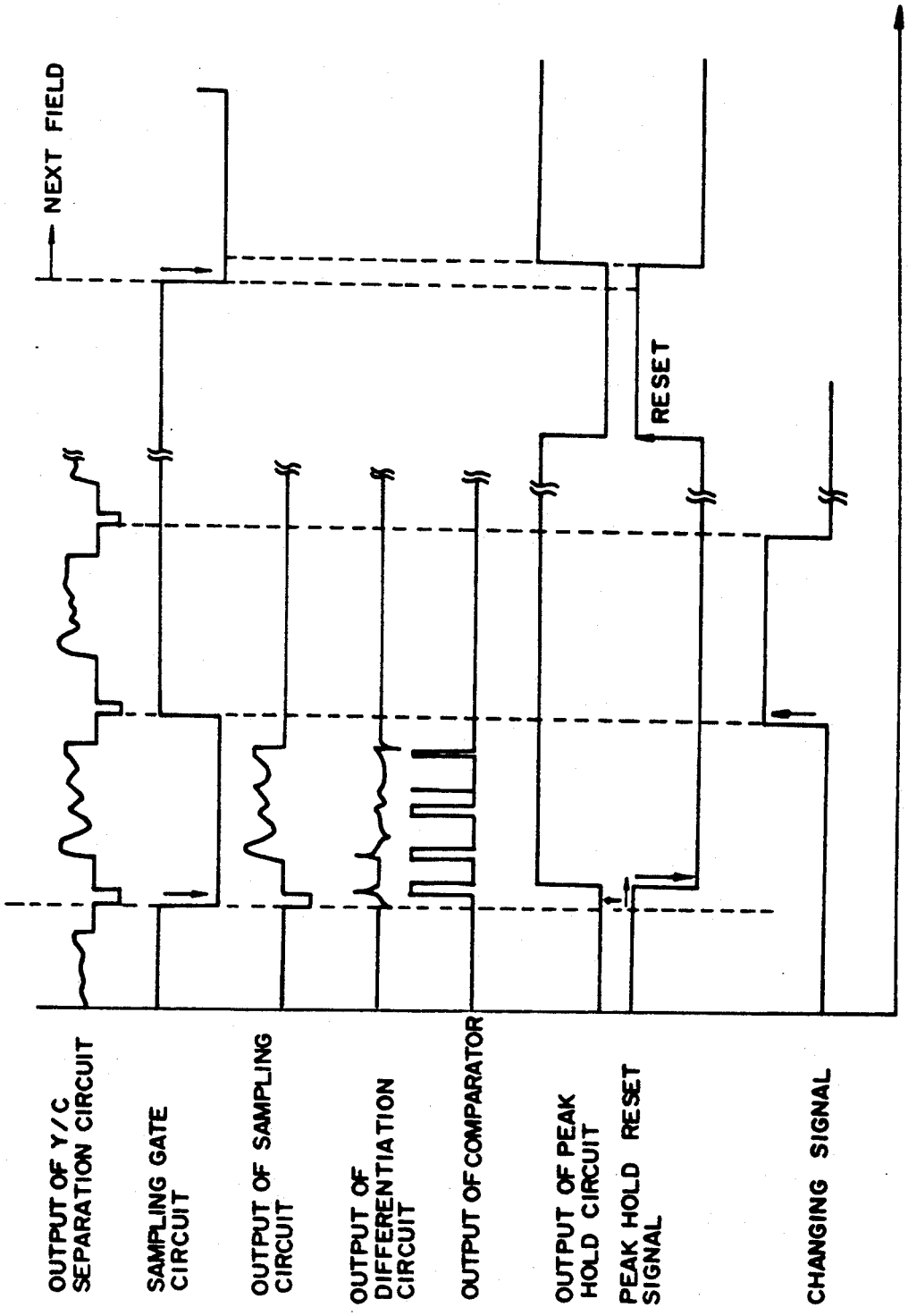
FIG. 2 is an output waveform chart of each part of the television receiver in FIG. 1.

FIGS. 1 and 2 show an embodiment of the invention. In FIG. 1, a television receiver has an input terminal (not shown) inputting video signals in the high vision system and an input terminal t inputting video signals in the NTSC system corresponding to the existing standard television system. When video signals in the high vision system inputted from the input terminal in the high vision system are displayed, a deflection control circuit 8 outputs desired V deflection signals and H deflection signals thereby the video signals are displayed throughout the whole picture plane of a picture tube 9.

The video signals inputted from the input terminal t of the NTSC system are led to a Y/C separation circuit 1. Brightness signals (Y) separated in the Y/C separation circuit 1 are outputted to a sampling circuit 2, which passes the inputted brightness signals only during L interval of a sampling gate signal. Outputs of the sampling circuit 2 are led to a differentiation circuit 3, and the differentiated signals are outputted to a comparator 4. The comparator 4 compares the output of the differentiation circuit 3 with the reference level (GND in the case of FIG. 2). When the output of the differentiation circuit 3 is larger than the reference level, the comparator 4 outputs H signal. In other words, when the video signal exists, the H signal appears. The output of the comparator 4 is led to a peak hold circuit 5, which holds the output of the comparator 4. The peak hold circuit 5 performs peak hold during L interval of a peak hold signal, and is reset at the rising point. Outputs of the peak hold circuit 5 are led through a change-over switch SW to three hold circuits 6a–6c selectively.

Figure 3A:
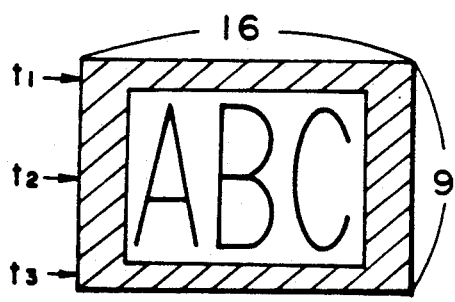
FIG. 3(a) is a diagram showing a display picture plane of letter box size in the normal mode state.

Every time the changing signals are changed to H interval at the timing of $t_1$, $t_2$, $t_3$ of FIG. 3(a), the change-over switch SW changes three selecting terminals a, b, c in this order in sequence, and is connected to the selecting terminals a, b, c only during the interval H and is connected to the neutral terminal (not shown) during the L interval. The three hold circuits 6a–6c hold H signal or L signal transmitted from the peak hold circuit 5 and output the held information to a decision circuit 7 respectively. The decision circuit 7 collects information of about five fields, for example, and if a =L, b =H, c =L regarding information of all five fields, the decision is made in that no variation occurs in the video signals, and a control signal for enlargement mode is transmitted to a deflection control circuit 8. Also if information of all five fields is other than that described above, the decision is made in that variation occurs in the video signals, and a control signal for normal mode is transmitted to the deflection control circuit 8. If the control signal for enlargement mode is inputted, the deflection control circuit outputs a vertical deflection signal and a horizontal deflection signal to a picture tube 9 so that the image size is enlarged in vertical and horizontal directions to be fitted to the picture plane size of the picture tube. Also if the control signal for normal mode is inputted, the deflection control circuit 8 outputs a vertical deflection signal and a horizontal deflection signal to the picture tube 9 so that the image is displayed in ordinary size without enlarging or decreasing the image size. The image tube 9 with the picture plane being long sideways and having the aspect ratio of 16:9 is used.

The video signals inputted from the input terminal t of the NTSC system are also led to a synchronization separation circuit 10. The synchronization separation circuit 10 separates vertical synchronous signal (V signal) and horizontal synchronous signal (H signal) from the video signals, and outputs the V signal and the H signal to a timing pulse generator 11 or the like. The timing pulse generator 11 generates the sampling gate signal, the peak hold signal, the changing signal and the hold reset signal as above described. That is, the V signal is used as reset signal and the H signal is counted, and the sampling gate signal to realize the L interval only at the interval of $t_1$, $t_2$, $t_3$ lines shown in FIG. 3(a) is outputted to the sampling circuit 2. In this case, the $t_1$, $t_3$ lines are set to range where single color such as black is inserted when the picture plane is made a letter box size, and the $t_2$ line is set to nearly the center portion of the picture plane. Also the V signal is used as reset signal and the H line is counted, and the peak hold signal to realize the L interval only in the interval of several lines from the $t_1$, $t_2$, $t_3$ lines shown in FIG. 3(a) is outputted to the peak hold circuit 5. However, the falling of the peak hold signal is at the timing delayed from the H signal detection state by t so that the H signal in the video signals is not subjected to the peak hold. Further the V signal is used as reset signal and the H line is counted, and the changing signal to realize the H interval of next one line of the $t_1$, $t_2$, $t_3$ lines shown in FIG. 3(a) is outputted to the change-over switch SW. Further, when the V signal is detected, the reset signal is outputted at this timing to the hold circuits 6a–6c.

The operation of in the above-mentioned constitution will be described referring to FIGS. 1 and 2 as follows.

If the video signal is inputted from the input terminal t in the NTSC system, since the sampling gate signal becomes the L interval in the $t_1$, $t_2$, $t_3$ lines of FIG. 3(a), the video signals of the $t_1$, $t_2$, $t_3$ lines are sampled in the sampling circuit 2. single color such as black, output of the differentiation circuit 3 becomes zero level and output of the comparator 4 becomes L signal. In other cases, the output of the differentiation circuit 3 becomes a signal varying as shown in FIG. 2 and the output of the comparator 4 becomes a signal including H signal. The peak hold circuit 5 holds peak values of the $t_1$, $t_2$, $t_3$ lines in sequence, and the selection position of the change-over switch SW is changed in the order of a, b, c thereby data on the $t_1$ line is held to the upper hold circuit 6a, data on the $t_2$ line is held to the middle hold circuit 6b, and data on the $t_3$ line is held to the lower hold circuit 6c respectively.

Figure 3B:
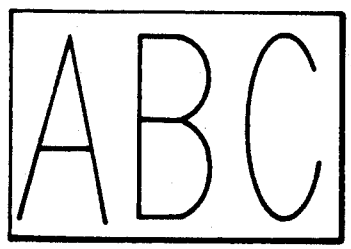
FIG. 3(b) is a diagram showing a display picture plane of letter box size in the enlargement mode state.
Figure 4B:
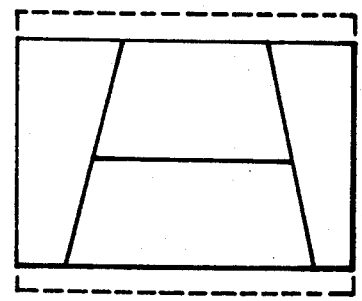
FIG. 4(b) is a diagram showing a display picture plane of normal size in the enlargement mode state.

If the input video signals are letter box size, since output of the peak hold circuit 5 in the $t_1$ line and the $t_3$ line becomes L signal and output of the peak hold circuit 5 in the $t_2$ line becomes H signal respectively, the decision circuit 7 outputs a control signal for enlargement mode, and in the picture tube 9, the effective image is displayed throughout the whole picture plane as shown in FIG. 3(b).

Figure 4A:
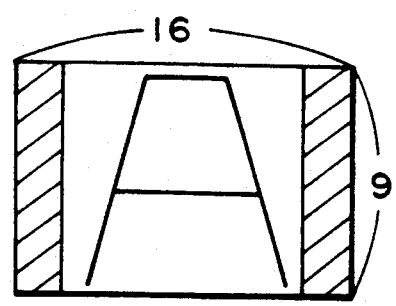
FIG. 4(a) is a diagram showing a display picture plane of normal size in the normal mode state.

If the input video signals are normal size, in general, since output of the peak hold circuit 5 in the $t_1$, $t_2$, $t_3$ lines becomes H signal and even if any one line becomes L signal other line becomes H signal, the decision circuit 7 outputs a control signal for normal mode, and in the picture tube 9, the effective image is displayed without lacking upper and lower ends as shown in FIG. 4(a).

In the embodiment, although the three points in the $t_1$, $t_2$, $t_3$ lines are the detection object, only $t_1$ and/or $t_3$ may be the detection object. However, if $t_2$ is also made the detection object, advantage exists in that decision can be made as to whether a video signal exists or not.

In this embodiment, the description has been made regarding the case of decision of letter box size and normal size in the NTSC system, but the invention also be applied to other sizes.

According to the invention as above described, in a television receiver having a picture tube with the picture plane aspect ratio being different from the image size aspect ratio in the existing standard television system, when an image in the existing standard television system is displayed, variation of the video signal positioned adjacent to at least one of the upper and lower ends of the picture plane of the picture tube is detected. If no variation exists, enlargement mode enlarging the image size is selected, and if any variation exists, normal mode displaying the image size in normal size is selected. Since enlargement mode or normal mode is selected automatically in response to the effective image size, the troublesome work of changing the modes in manual operation can be eliminated.

What is claimed is:

1. Apparatus for controlling display of an image on a television receiver having a picture tube with a picture plane aspect ratio different than an image size aspect ratio of an existing standard television system, comprising:

sampling means receiving an image signal for display on said picture tube, for sampling a horizontal scan line of said image signal at a predetermined position adjacent one vertical end on the picture plane of said picture tube and producing a sampled signal;

comparator means for comparing said sampled signal with a predetermined reference value for determining whether said sampled signal includes a variation along said horizontal scan line adjacent said one vertical end and producing an output signal; and decision means receiving said output signal from said comparator means for controlling a size of the large displayed on said picture tube, whereby an enlargement mode is selected if no variation exists along said predetermined horizontal scan line and whereby a normal mode is selected for displaying the image signal with no enlargement if a variation is determined along said horizontal scan line at said predetermined position.

2. The apparatus according to claim 1, further comprising timing pulse generator means receiving said image signal fed to said sampling means for producing a gate signal fed to said sampling means for controlling said sampling means to sample said horizontal scan line adjacent at said predetermined position adjacent one vertical end of said picture tube.

3. The apparatus according to claim 2, wherein said gate signal produced by said timing pulse generator means controls said sampling means to sample said predetermined horizontal scan line adjacent an upper end of said picture tube and further controls said sampling means to sample a second horizontal scan line at a second predetermined position substantially at the middle of said picture tube and to sample a third horizontal scan line at a third predetermined position adjacent a lower end of said picture tube and wherein said comparator means produce a respective output signal for each of said first, second, and third predetermined positions.

4. The apparatus according to claim 2, further comprising first, second, and third peak hold circuits having respective outputs connected to said decision means, and a selector switch receiving outputs from said comparator means and respectively connecting outputs corresponding to said first, second, and third predetermined positions to said first, second, and third peak hold circuits.

5. The apparatus according to claim 4, wherein said decision means include means for checking output signals from said comparator means and determining that no variation occurs in said horizontal scan lines at the upper and lower ends of the picture tube and that a variation occurs in said horizontal scan line at the middle of the picture tube and upon such determination selecting said enlargement mode.

6. The apparatus of claim 1, further comprising a luminance/chrominace separation circuit receiving said image signal for separating said luminance signal therefrom and feeding the separated luminance signal to said sampling means.

7. The apparatus according to claim 1 further comprising a differentiation circuit for differentiating said sampled signal from said sampling means and feeding the differentiated sample signal to said comparator means.

8. The apparatus according to claim 1, further comprising a peak hold circuit for holding peak values of the output signal from said comparator means and feeding held peak values to said decision means.

* * * * *

UNITED STATES PATENT AND TRADEMARK OFFICE
CERTIFICATE OF CORRECTION

PATENT NO. : 5,220,423
DATED : June 15, 1993
INVENTOR(S) : Takashi Chikuma

It is certified that error appears in the above-indentified patent and that said Letters Patent is hereby corrected as shown below:

On title page, item [56]"References Cited" change "Miyochi"
    to --Miyoshi--

```
              line 10, after "variation" insert --exists,--
Col. 3, line 13, delete "in" first occurrence
        line 17, delete "in" first occurrence
        line 21, after "circuit" insert --8--
Col. 4, line 2, after"2." insert --If a signal among the
        video signals of the t1, t2, t3 lines is--
        line 37, after "invention" insert --can--
```

In the Claims:
```
Col. 4, line 61, delete ","
Col. 5, line  5, change "large" to --image--
Col. 6, line  1, change "2" to --3--
        line 18, change "chrominace" to --chrominance--
        line 22, after "1" insert--,--
```

Signed and Sealed this

Eighth Day of November, 1994

Attest:

BRUCE LEHMAN

*Attesting Officer*  *Commissioner of Patents and Trademarks*